(12) United States Patent
Sarnowski (10) Patent No.: US 11,293,466 B2
(45) Date of Patent: Apr. 5, 2022

(54) EXPANDING ACCESSORY END ADAPTER

(71) Applicant: GEM Products, Inc., Jacksonville, FL (US)

(72) Inventor: Jason Sarnowski, Jacksonville, FL (US)

(73) Assignee: GEM Products, Inc., Jacksonville, FL (US)

( * ) Notice: Subject to any disclaimer, the term of this patent is extended or adjusted under 35 U.S.C. 154(b) by 162 days.

(21) Appl. No.: 16/588,359

(22) Filed: Sep. 30, 2019

(65) Prior Publication Data

US 2021/0095706 A1   Apr. 1, 2021

(51) Int. Cl.
*F16B 7/04*   (2006.01)

(52) U.S. Cl.
CPC .................................. *F16B 7/042* (2013.01)

(58) Field of Classification Search
CPC .............................. F16B 7/1445; F16B 7/1463
See application file for complete search history.

(56) References Cited

U.S. PATENT DOCUMENTS

| | | | | |
|---|---|---|---|---|
| 2,503,997 A * | 4/1950 | Bu Miller | ............. | F16B 7/1445 248/188.5 |
| 2,508,039 A * | 5/1950 | Neuwirth | ............... | F16B 7/1463 248/188.5 |
| 2,542,967 A * | 2/1951 | Waechter | ............... | F16M 11/32 248/188.5 |
| 2,999,706 A * | 9/1961 | Wilcox | ................. | F16B 7/1463 403/370 |
| 4,134,703 A * | 1/1979 | Hinners | ............... | A63C 11/221 248/188.5 |
| 4,896,687 A * | 1/1990 | Segal | ....................... | A45B 9/00 135/141 |
| 5,419,650 A * | 5/1995 | Hoshino | ................. | F16B 9/054 403/370 |
| 5,765,812 A * | 6/1998 | Guenther | ............ | E04F 11/1804 256/65.15 |
| 6,202,663 B1 * | 3/2001 | Uemura | .................... | A45B 9/00 135/65 |
| 8,469,624 B2 * | 6/2013 | Carrabs | ................. | F16B 41/002 403/370 |
| 10,337,547 B2 | 7/2019 | Onorato et al. | | |
| 2006/0204322 A1 * | 9/2006 | Roiser | ...................... | A45B 9/00 403/109.5 |
| 2012/0311914 A1 | 12/2012 | Appel et al. | | |
| 2019/0104714 A1 | 4/2019 | Serocki | | |

FOREIGN PATENT DOCUMENTS

EP        0314357 A2 *   5/1989   ............... A47L 1/06

OTHER PUBLICATIONS

MOS Equipment Fishing Rod Coiled Safety Line [online], [retrieved on Sep. 23, 2019], Retrieved from the Internet: <URL: https://www.amazon.com/MOS-Equipment-Fishing-Coiled-Safety/dp/B00E4FXHY8Ptag=lege1-20>.
GEMLUX OR-BA-01 [online], [retrieved on Sep. 23, 2019]. Retrieved from the Internet: <URL https://www.gemlux.com/OR-BA-01>.

* cited by examiner

*Primary Examiner* — Daniel J Wiley
(74) *Attorney, Agent, or Firm* — Seyfarth Shaw LLP (57) ABSTRACT

An end adapter including first and second wedges and an expanding portion. The end adapter is capable of releasably coupling an accessory, for example outrigger poles, fishing rods, shade poles, etc., to a mount. The expanding portion can be axially compressed, which causes radial expansion, to retain the end adapter and the accessory in the mount.

22 Claims, 6 Drawing Sheets

EXPANDING ACCESSORY END ADAPTER

TECHNICAL FIELD OF THE INVENTION

The present application relates generally to end adapters. More particularly, the present application relates to end adapters adapted to couple accessories to a mount.

BACKGROUND OF THE INVENTION

Mounts are often used to hold accessories, such as, for example, outrigger poles, fishing rods, shade poles, fender holders, flagpoles, boarding handles, power line holders, etc., to support structures, such as boats. The motion of the boat can include violent vertical movement that can cause the accessories, such as fishing rods, to "jump" out of mounts that are substantially vertical. Moreover, rough water can cause the boat to list from side to side in such a way that accessories, such as outrigger poles, can slide out of mounts that are substantially horizontal. The result of the accessories becoming decoupled from their mounts is that the accessories can fall into the water and be lost, on passengers, thereby causing injury, and/or onto the deck of the boat, thereby creating a moving obstacle and tripping hazard.

Fishing rods are typically secured to mounts by adding a cord (also referred to as a leash) to the fishing rod or reel. These solutions essentially attach a cord from the rod or reel to a fixed point on the boat, such as US2012/0311914 and MOS Equipment's Fishing Rod Coiled Safety Line. However, these solutions require a cord that takes up additional room on the boat, which can also become a tripping hazard, and still allow the rod and reel to fall into the water and/or on the deck of the boat.

Outrigger poles are typically secured in mounts by inserting a pin through an aperture in the mount and an aperture in the outrigger pole, or other such similar accessory, thereby preventing axial displacement of the outrigger pole relative to the mount, such as GEMLUX's Outrigger Base (OR-BA-01). However, the apertures in the outrigger and the mount must be aligned to install the pin.

Another solution for securing outrigger poles to outrigger mounts is to insert the outrigger pole into the mount along a track, press against a spring using the outrigger pole, and rotate the outrigger pole into a second position, thus locking the outrigger pole to the mount, such as US2019/0104714. The outrigger pole and mount are specifically designed to be combined and do not function outside of this combination. Further, this does not permit rotational movement to optimize the rotational position of the outrigger pole relative to the mount.

SUMMARY OF THE INVENTION

The present invention broadly comprises an end adapter adapted to be coupled to an accessory, such as, for example, outrigger poles, fishing rods, shade poles, fender holders, flagpoles, boarding handles, power line holders, etc. The end adapter includes an expanding portion adapted to retain the accessory in a mount using a simple and secure means, compared to the prior art. Unlike the prior art, the end adapter allows for the rotational positioning of the accessory to be optimized and restricts axial movement of the accessory relative to the mount.

In an embodiment, the present invention broadly comprises an end adapter adapted to releasably couple an accessory to a mount. The end adapter includes first and second wedges, and an expanding portion disposed between the first and second wedges which is adapted to expand in a radial direction to couple to the mount when compressed by the first and second wedges in an axial direction.

In another embodiment, the present invention broadly comprises an end adapter adapted to releasably couple an accessory to a mount. The end adapter includes an adapter portion adapted to be coupled to the accessory, an end portion, first and second wedges, an expanding portion disposed between the first and second wedges which is adapted to expand in a radial direction to couple to the mount when compressed by the first and second wedges in an axial direction, and a shank portion coupled to the end portion and the adapter portion that extends through the first and second wedges and the expanding portion. Rotation of the adapter portion relative to the end portion in a first direction causes the first and second wedges to compress the expanding portion in the axial direction.

In another embodiment, the present invention broadly comprises an end adapter adapted to releasably couple an accessory to a mount. The end adapter includes an end portion, first and second wedges, an expanding portion disposed between the first and second wedges which is adapted to expand in a radial direction to couple to the mount when compressed by the first and second wedges in an axial direction, a shank portion coupled to the end portion that extends through the first and second wedges and the expanding portion, and a grip threadably coupled to the shank portion. Rotation of the grip in a first direction causes the first and second wedges to compress the expanding portion in the axial direction.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly comprises an end adapter having an expanding portion adapted to couple with a mount. The end adapter is adapted to couple with an accessory, such as, for example and without limitation, outrigger poles, fishing rods, shade poles, fender holders, flagpoles, boarding handles, power line holders, etc. The expanding portion can be adapted to be used with a variety of differently sized mounts. The rotational position of the accessory relative to the mount can be adjusted prior to securing the accessory to the mount.

Figure 1:
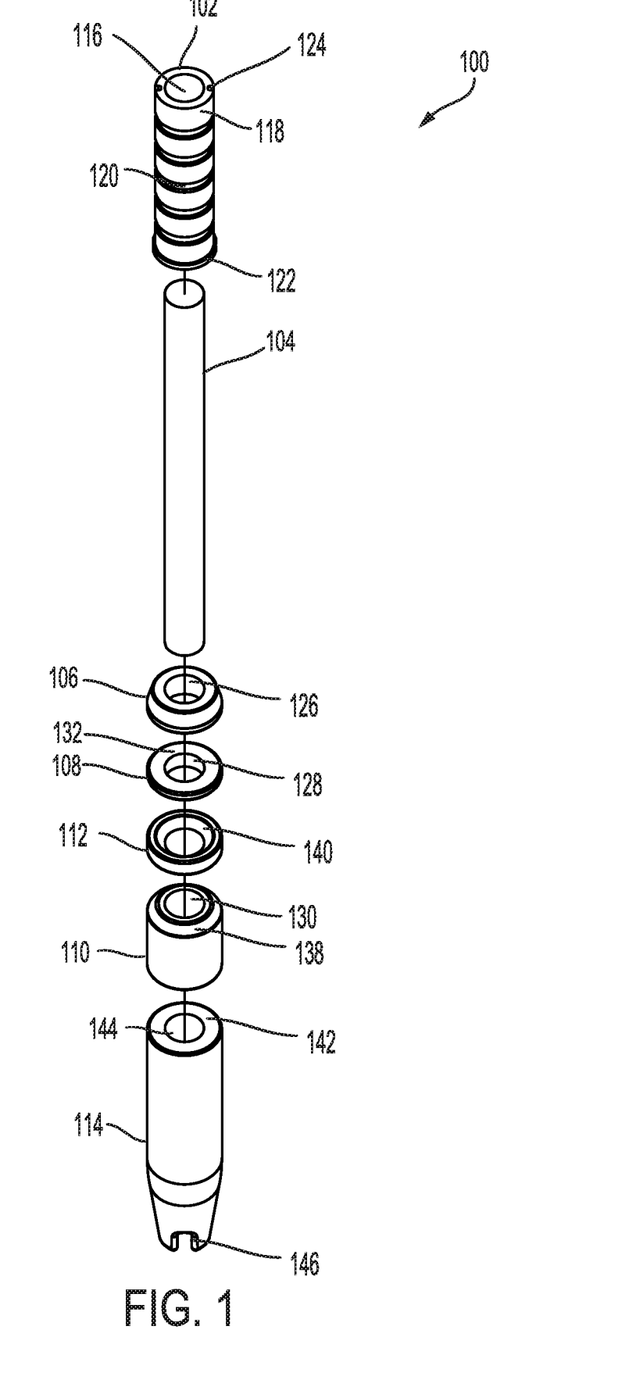
FIG. 1 is a side perspective, exploded view of a mount according to an embodiment of the present invention.
Figure 2:
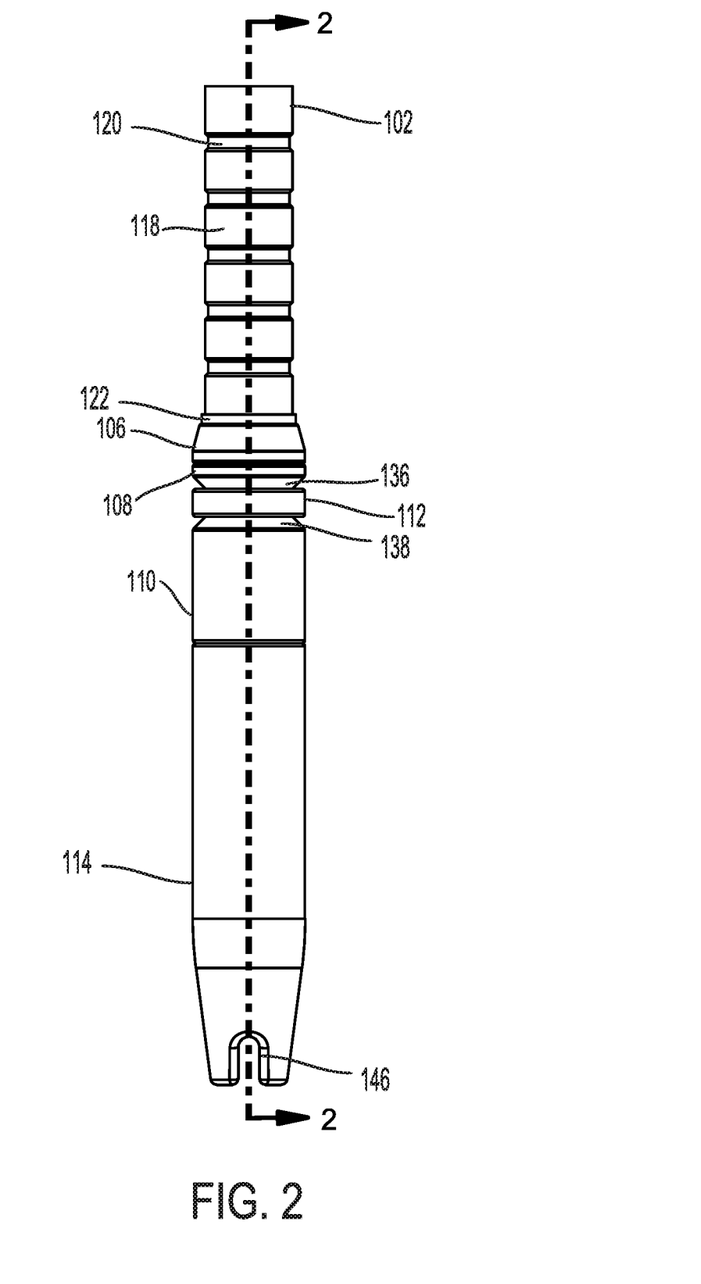
FIG. 2 is a side plan view of the mount of FIG. 1.
Figure 3:
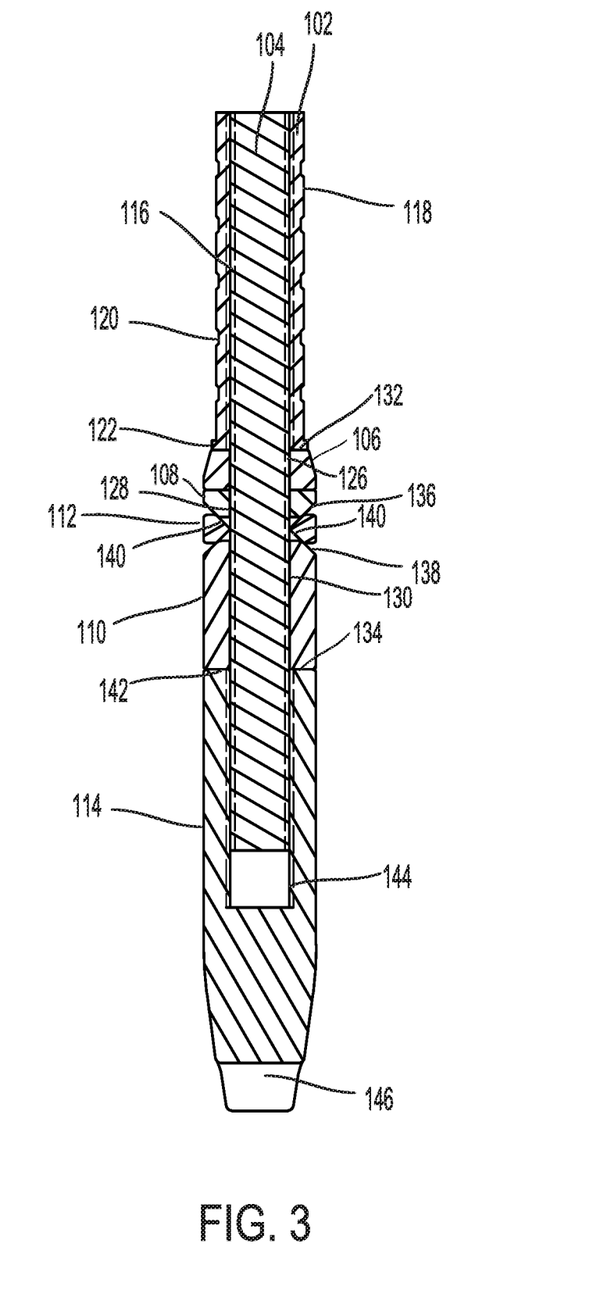
FIG. 3 is a side cross-sectional view of the mount of FIG. 1, as taken along line 2-2 in FIG. 2.

Referring to FIGS. 1-3, in an embodiment, an end adapter 100 can include an adapter portion 102 that is adapted to couple to an accessory (not shown), a shank portion 104, a collar 106, first 108 and second 110 wedges, an expanding portion 112, and an end portion 114. As discussed below, the expanding portion 112 is adapted to be releasably coupled with a mount (not shown), thereby restricting movement of the end adapter 100 relative to the mount, when desired. When the expanding portion 112 is not coupled to the mount, the end adapter 100 can be rotatable relative to the mount. Rotation of the accessory relative to the end portion 114 causes expansion of the expanding portion 112, thereby securing the accessory within the mount. This embodiment can be used when the rotational position of the accessory is unimportant, such as, for example, accessories that make use of rotational attachment points, as shown in U.S. Ser. No. 10/337,547.

The adapter portion 102 can be a hollow tube, or other suitable shape, and can be constructed from plastic, or other suitable material. An inside surface 116 of the adapter portion 102 is adapted to couple with the shank portion 104. The inside surface 116 may be threaded or partially threaded such that the adapter portion 102 is threadably coupled to the shank portion 104. The adapter portion 102 can be further secured to the shank portion 104 with adhesive to restrict rotation therebetween.

An outside surface 118 of the adapter portion 102 is adapted to be inserted into an end of the accessory. The accessory can have a tubular shape, or other suitable hollow shape, where the end is adapted to receive the adapter portion 102. The outside surface 118 can include a number of circumferential grooves 120, which can then be adapted to frictionally engage the adapter portion 102 to the accessory. In an embodiment, adhesive can be included on the outer surface 118 to couple the adapter portion 102 to the accessory.

An end of the adapter portion 102 can include a radially extending protrusion 122, which creates a positive stop when the adapter portion 102 is inserted into the accessory.

The adapter portion 102 can also include a number of longitudinal grooves 124. Cords, such as a silicone cord, for example, can be disposed in the longitudinal grooves 124 prior to insertion of the adapter portion 102 into the accessory. After the insertion, the cords can be removed, thereby leaving an open orifice, which functions as a vent, to prevent pressure build-up in the accessory when the accessory is collapsible and includes collapsible nesting tubes.

The shank portion 104 can be constructed from stainless steel, or other suitable material. The shank portion 104 can be a fully or partially threaded rod. As described above, the shank portion 104 is coupled to the adapter portion 102. The shank portion can be threadably coupled to the end portion 114. As described below, rotating the shank portion 104 relative to the end portion 114 in a first direction causes the expanding portion 112 to be axially compressed, thereby causing the expanding portion 112 to expand in a radial direction. Rotation of the shank portion 104 relative to the end portion 114 in a second direction relieves axial compression, which allows the expanding portion 112 to return to its original state.

In an embodiment, the collar 106 can have a circular cross-section, or other suitable shape, and can be constructed from plastic, or other suitable material. The collar 106 is adapted to be disposed between the adapter portion 104 and the first 108 or second 110 wedge. In an embodiment, the collar is part of, or formed from, the adapter portion 102. The collar 106 can include an aperture 126 adapted to allow the shank portion 104 to pass therethrough. The collar 106 can have a shape that provides a visually pleasing transition between an outside surface of the accessory and the end adapter 100.

The first 108 and second 110 wedges can have circular cross-sections, or other suitable shapes, and can be constructed from plastic, or other suitable material. The first 108 and second 110 wedges are adapted to be disposed between the collar 106 and the end portion 114 or the adapter portion 102 and the end portion 114. In an embodiment, one of the first 108 and second 110 wedges are part of or formed from the adapter portion 102 or the collar 106, and the other of the first 108 and second 110 wedges are part of or formed from the end portion 114. The first 108 wedge can include an aperture 128 adapted to allow the shank portion 104 to pass therethrough, a flat surface 132 adapted to abut the collar 106 or the end portion 114, and a contact surface 136 shaped to correspond with one of the contact surfaces 140 disposed on the expanding portion 112. The second 110 wedge can include an aperture 130 adapted to allow the shank portion 104 to pass therethrough, a flat surface 134 adapted to abut the collar 106 or the end portion 114, and a contact surface 138 shaped to correspond with one of the contact surfaces 140 disposed on the expanding portion 112. In an embodiment, the first 108 and second 110 wedges are different respective lengths.

The expanding portion 112 can have a circular cross-section, or other suitable shape, and can be constructed from an elastomeric material, or other suitable material. The expanding portion 112 has a circular cross-section when adapted to couple to a cylindrical mount. The expanding portion 112 is disposed between the first 108 and second 110 wedges. The contact surfaces 140 of the expanding portion and the respective contact surfaces 136 and 138 of the first 108 and second 110 wedges can be angled to reduce friction between the expanding portion 112 and the first 108 and second 110 wedges and are adapted to convert axial compression of the expanding portion 112 into expansion in a radial direction with less applied force, thereby causing contact between the expanding portion 112 and an inside surface of the mount to couple the end adapter 100 and the accessory therein. In addition, the elastomeric material of the expanding portion 112 is adapted to cause the expanding portion 112 to retract in the radial direction when the axial compression of the expanding portion 112 is released, thereby allowing the end adapter 100 to be removed from the mount. In an embodiment, the first 108 and second 110 wedges are different lengths, wherein the position of the expanding portion 112 along the length of the end adapter 100 can be changed by swapping the position of the first 108 and second 110 wedges. Further, when the expanding portion 112 has a circular cross-section, the diameter can be changed to accommodate the diameter of the cylindrical mount. In an embodiment, additional expanding portions can be used to increase stability.

The end portion 114 can be made of plastic, or other suitable material, and is adapted to be inserted into the mount. The end portion 114 can have a flat surface 142 that abuts one of the first 108 and second 110 wedges. The end portion 114 includes an aperture 144 adapted to couple with the shank portion 104. The aperture 144 can be fully or partially threaded and adapted to threadably couple with the shank portion 104. The end portion 114 includes one or more slots 146, which are adapted to couple with a pin or shelf in the mount to restrict or limit rotation of the end portion 114 relative to the mount when the accessory is rotated.

Accordingly, when the accessory, which is coupled to the adapter portion, is rotated in a first direction relative to the end portion 114, the shank portion 104 is caused to be inserted further into the end portion 114, which causes the adapter portion 102 and the collar 106 to move in an axial direction towards the end portion 114, thereby causing the first 108 and second 110 wedges to exert axial compression on the expanding portion 112 by decreasing the distance therebetween. When the accessory is rotated in an opposing second direction relative to the end portion 114, the shank portion 104 retracts from the end portion, which causes the adapter portion 102 and the collar 106 to move in an axial direction away from the end portion 114, thereby causing the first 108 and second 110 wedges to release axial compression on the expanding portion 112.

Figure 4:
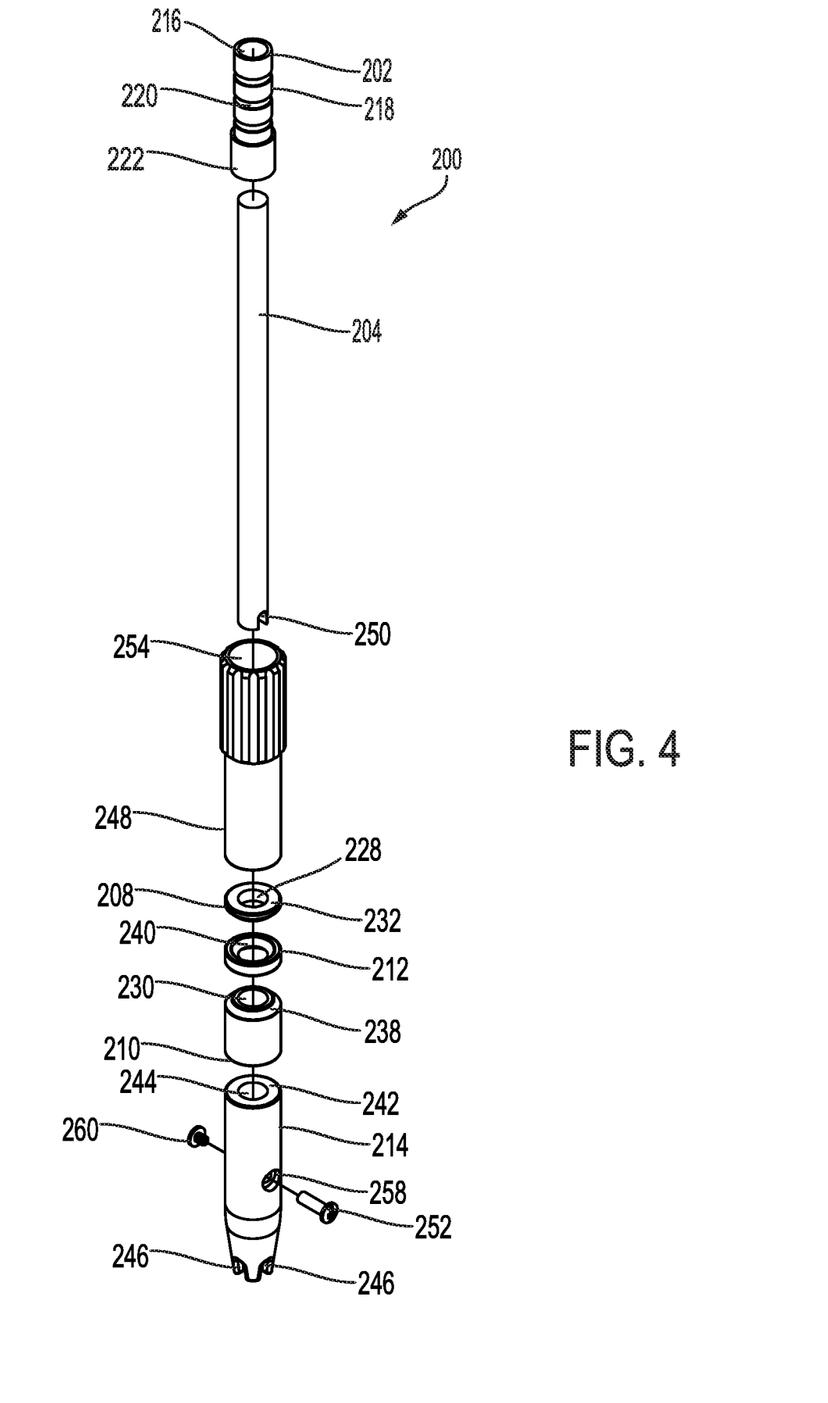
FIG. 4 is a side perspective, exploded view of a mount according to another embodiment of the present invention.
Figure 5:
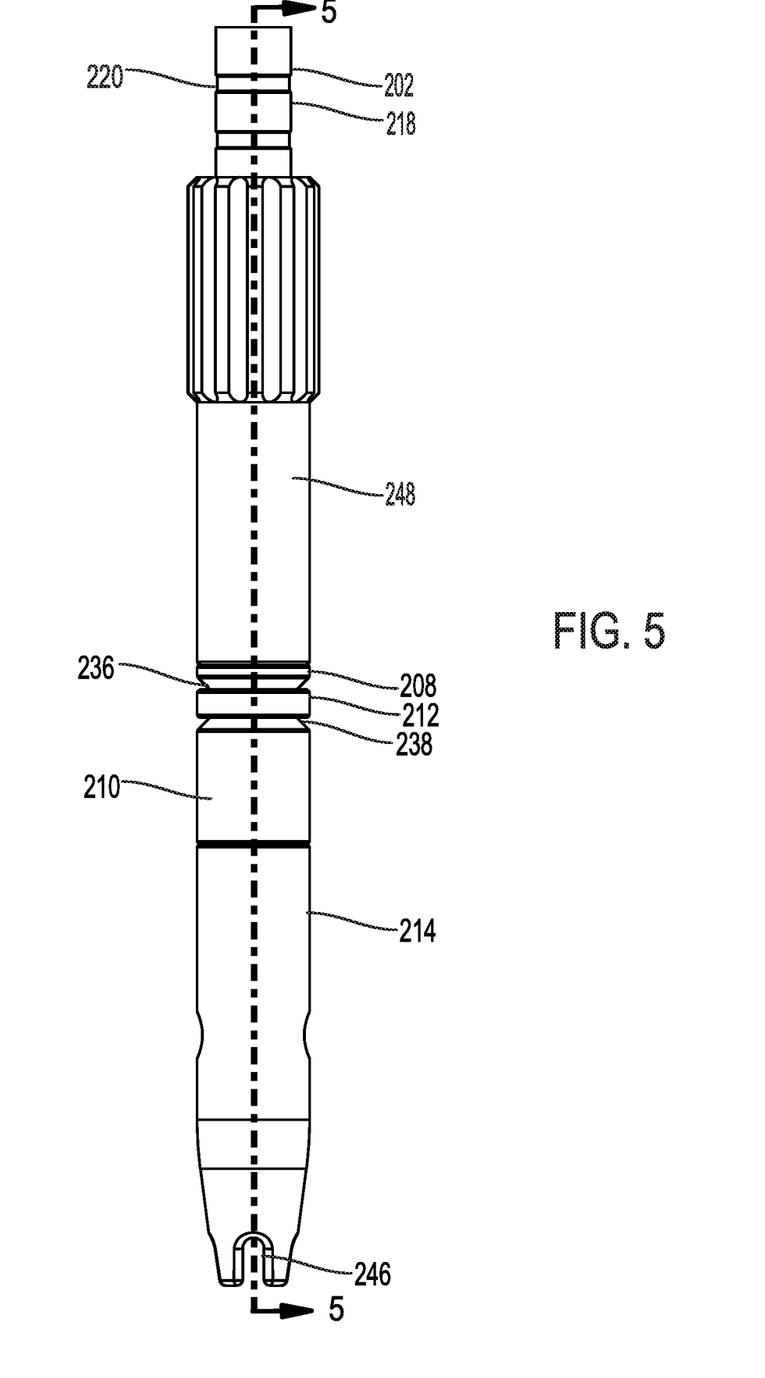
FIG. 5 is a side plan view of the mount of FIG. 4.
Figure 6:
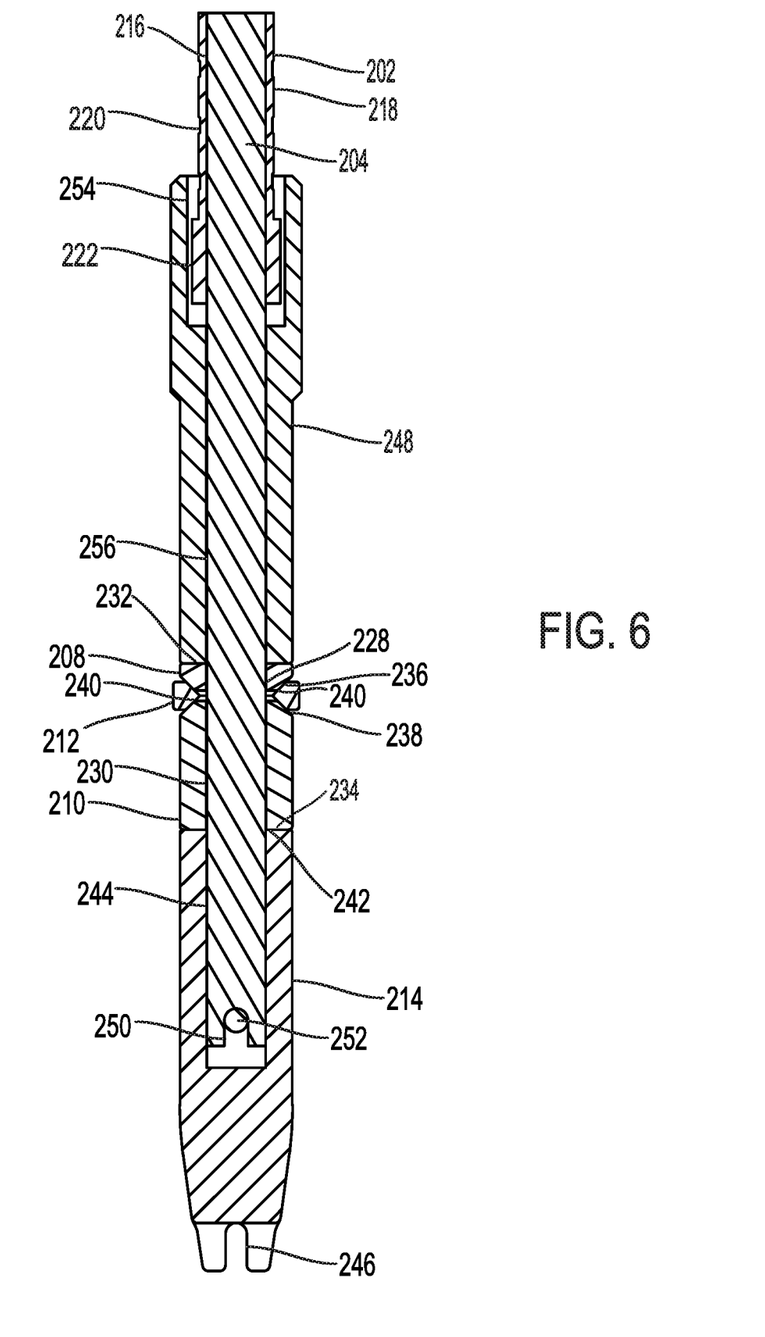
FIG. 6 is a side cross-sectional view of the mount of FIG. 4, as taken along line 5-5 in FIG. 5.

Referring to FIGS. 4-6, in another embodiment, an end adapter 200 can include an adapter portion 202 that is adapted to couple to an accessory (not shown), a shank portion 204, a grip 248, first 208 and second 210 wedges, an expanding portion 212, and an end portion 214. As discussed below, the expanding portion 212 is adapted to be coupled with a mount (not shown), thereby restricting movement of the end adapter 200 relative to the mount. When the expanding portion 212 is not coupled to the mount, the end adapter 200 can be rotatable relative to the mount. In this embodiment, rotation of the grip 248 causes radial expansion of the expanding portion 212, thereby securing the accessory within the mount. This embodiment can be used when the rotational position of the accessory must be maintained relative to the mount, such as, for example, fishing rods or outrigger poles with fixed attachment points.

The adapter portion 202 is substantially similar to the adapter portion 102 described above Similar to the adapter portion 102 described above, the adapter portion 202 includes an inside surface 216 adapted to couple with the shank portion 204. The inside surface 216 may be threaded or partially threaded such that the adapter portion 202 is threadably coupled to the shank portion 204. An outside surface 218 of the adapter portion 202 is adapted to be inserted into an end of the accessory. The adapter portion 202 can be secured to the shank portion 204 with adhesive, friction fit or interference fit to restrict rotation therebetween. The outside surface 218 can include a number of circumferential grooves 220 adapted to hold adhesive therein to securely fix the adapter portion 202 to the accessory. An end of the adapter portion 202 can include a radially extending protrusion 222. The radially extending protrusion 222 creates a positive stop when the adapter portion 202 is inserted into the accessory. The adapter portion 202 can also include a number of longitudinal grooves (not shown), which can function as vents to reduce pressure build-up, as described above.

The shank portion 204 is substantially similar to the shank portion 104 described above. In this embodiment, the shank portion 204 is selectively removable from the end portion 214, such that when the end adapter 200 is in an operational mode the adapter portion 202, the shank portion 204, and the end portion 214 are restricted from rotating relative to one another. Rotation is limited by inserting the shank portion 204 into the end portion 214 until a fastener slot 250 disposed in the shank portion 204 couples with a first fastener 252, such as, for example, a barrel nut, that is inserted through the end portion 214. When the shank portion 204 is coupled with the first fastener 252, the end adapter 200 is in operational mode. Removing the first fastener 252 allows for disassembly of the end portion 214 from the shank portion 204 for replacement and/or repositioning of the expanding portion 212.

The grip 248 can be constructed from plastic, or other suitable material. The grip can include a cavity 254 adapted to fit around the adapter portion 202, the shank portion 204, and a length of the accessory to cover at least a portion thereof as the grip 248 moves in an axial direction away from the accessory. The grip 248 can include an aperture 256 adapted to couple with the shank portion 204. The aperture 256 can be partially or fully threaded. The aperture 256 is adapted to couple with the shank portion 204 such that rotation of the grip 248 causes the first 208 and second 210 wedges to axially compress the expansion portion 212, thereby increasing the size of the expansion portion 212 in a radial direction. The grip 248 can have an outside surface adapted to allow a user to easily hold the grip 248 as it is rotated about a primary axis of the end adapter 200.

The first 208 and second 210 wedges and the expanding portion 212 are substantially similar to the first 108 and second 110 wedges and the expanding portion 112 described above. The first 208 and second 210 wedges are adapted to be disposed between the grip 248 and the end portion 214. In an embodiment, one of the first 208 and second 210 wedges are part of or formed from the grip 248, and the other of the first 208 and second 210 wedges are part of or formed from the end portion 214. The first 208 wedge can include an aperture 228 adapted to allow the shank portion 204 to pass through, a flat surface 232 adapted to abut the grip 248 or the end portion 214, and a contact surface 236 shaped to correspond with one of the contact surfaces 240 disposed on the expanding portion 212. The second 210 wedge can include an aperture 230 adapted to allow the shank portion 204 to pass therethrough, a flat surface 234 adapted to abut the grip 248 or the end portion 214, and a contact surface 238 shaped to correspond with one of the contact surfaces 240 disposed on the expanding portion 212.

The end portion 214 is substantially similar to the end portion 114 described above. The end portion 214 can have a flat surface 242 that abuts one of the first 208 and second 210 wedges. The end portion 214 has an aperture 244 adapted to couple with the shank portion 204. The aperture 244 can be fully or partially threaded and adapted to threadably couple with the shank portion 204.

The end portion 214 can include one or more slots 246, which are adapted to couple with a pin or shelf in the mount to restrict or limit rotation of the end portion 214 relative to the mount. Coupling of the slots 246 and the pin restricts rotation of the end portion 214, such that when the grip 248 is rotated in either one of first and second directions relative to the end portion 214, axial compression or release of the expanding portion 212 occurs without rotating the accessory. However, coupling of the slots 246 and the pin are not necessary to cause axial compression or release of the expanding portion 212. Instead, a user can manually hold the accessory to restrict the accessory from rotating while the grip 248 is rotated relative to the accessory to cause axial compression of the expanding portion 212, thereby locking the orientation of the accessory relative to the mount into place. This enables the accessory to be placed in any desired rotational orientation, rather than be subject to the preset rotational positions allowed by the slots 246.

The end portion 214 can include an aperture 258 adapted to be concentric with the fastener slot 250 and to accept the first fastener 252 and a second fastener 260, such as, for example, a screw. When the first 252 and second 260 fasteners are disposed through the aperture 258 and the fastener slot 250, rotation of the end portion 214 relative to the shank portion 204 is restricted. The aperture 258 can be adapted such that the first 252 and second 260 fasteners do not protrude from an outside surface of the end portion 214, thereby increasing overall comfort of a user.

As discussed above, the first fastener 252 can be a barrel bolt, and the second fastener can be a screw. The first 252 and second 260 fasteners can be constructed from stainless steel, or other suitable material. The first fastener 252 is adapted to couple with the second fastener 260, thereby retaining the first fastener 252 in the aperture 258.

Accordingly, when the grip 248 is rotated in a first direction relative to the end portion 214 and the accessory, the grip 248 moves in an axial direction towards the end portion 214, thereby causing the first 208 and second 210 wedges to exert axial compression on the expanding portion 212 by decreasing the distance therebetween. When the grip 248 is rotated in a second direction relative to the end portion 214 and the accessory, the grip 248 moves in an axial direction away from the end portion 214, thereby causing the first 208 and second 210 wedges to release axial compression on the expanding portion 212.

In another embodiment, the adapter portion 102, 202 is angled when adapted to be used with an angled accessory, such as, for example, an angled fishing rod butt.

As used herein, the term "coupled" and its functional equivalents are not intended to necessarily be limited to direct, mechanical coupling of two or more components. Instead, the term "coupled," and its functional equivalents, are intended to mean any direct or indirect mechanical, electrical, or chemical connection between two or more objects, features, work pieces, and/or environmental matter. "Coupled" is also intended to mean, in some examples, one object being integral with another object. Further, coupling can include, and is not limited to, using adhesives, pinned connections, welding, or any other securing method.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. An end adapter adapted to releasably couple an accessory to a mount, comprising:
   an adapter portion adapted to be coupled to the accessory;
   an end portion;
   first and second wedges disposed between axial ends of the adapter and end portions; and
   an expanding portion disposed between the first and second wedges and that is adapted to expand in a radial direction to couple with the mount when compressed by the first and second wedges in an axial direction.

2. The end adapter of claim 1, further comprising:
   a shank portion coupled to the end portion and the adapter portion and extending through the first and second wedges and the expanding portion.

3. The end adapter of claim 2, wherein the shank portion is a threaded rod and is threadably coupled to a first threaded aperture disposed in the end portion and a second threaded aperture disposed in the adapter portion.

4. The end adapter of claim 1, wherein the end portion includes a slot adapted to couple with a pin or a shelf disposed in the mount.

5. The end adapter of claim 1, wherein a first contact surface of the first wedge, a second contact surface of the second wedge and third and fourth contact surfaces of the expanding portion are angled.

6. An end adapter adapted to releasably couple an accessory to a mount, comprising:
   an adapter portion adapted to be coupled to the accessory;
   an end portion;
   first and second wedges disposed between the adapter and end portions;
   an expanding portion disposed between the first and second wedges and adapted to expand in a radial direction to couple with the mount when compressed by the first and second wedges in an axial direction;
   a shank portion coupled to the end portion and the adapter portion and extending through the first and second wedges and the expanding portion,
   wherein rotation of the adapter portion relative to the end portion in a first direction causes the first and second wedges to compress the expanding portion in the axial direction.

7. The end adapter of claim 6, further comprising a collar disposed adjacent the adapter portion.

8. The end adapter of claim 6, wherein rotation of the adapter portion relative to the end portion in a second direction decreases compression exerted by the first and second wedges on the expanding portion in the axial direction and causes retraction of the expanding portion in the radial direction.

9. The end adapter of claim 6, wherein the first and second wedges have different respective lengths.

10. The end adapter of claim 6, wherein the adapter portion includes a longitudinal groove.

11. The end adapter of claim 6, wherein the adapter portion includes a radially extending protrusion.

12. The end adapter of claim 6, wherein rotation of the adapter portion relative to the end portion in the first direction causes the shank portion to be inserted further into the end portion and rotation of the adapter portion relative to the end portion in a second direction causes the shank portion to retract from the end portion.

13. The end adapter of claim 6, wherein the shank portion is a threaded rod.

14. The end adapter of claim 6, wherein the end portion includes a slot adapted to couple with a pin or a shelf disposed in the mount.

15. An end adapter adapted to releasably couple an accessory to a mount, comprising:
    an end portion;
    first and second wedges;
    an expanding portion disposed between the first and second wedges and adapted to expand in a radial direction to couple with the mount when compressed by the first and second wedges in an axial direction;

a shank portion coupled to the end portion and extending through the first and second wedges and the expanding portion;
a grip threadably coupled to the shank portion,
wherein the first and second wedges are disposed between the grip and end portion, and
wherein rotation of the grip in a first direction causes the first and second wedges to compress the expanding portion in the axial direction.

16. The end adapter of claim 15, further comprising an adapter portion coupled to the accessory and the shank portion.

17. The end adapter of claim 16, wherein the adapter portion includes a circumferential groove.

18. The end adapter of claim 15, wherein the shank portion includes a slot and the end portion includes an aperture.

19. The end adapter of claim 18, further comprising a fastener disposed in the aperture and adapted to couple with the slot, the fastener is adapted to restrict rotation of the shank portion relative to the end portion when coupled with the slot.

20. The end adapter of claim 15, wherein the grip abuts one of the first and second wedges and the end portion abuts the other of the first and second wedges.

21. The end adapter of claim 15, wherein rotation of the grip in the first direction causes the grip to axially move towards the end portion and rotation of the grip in a second direction causes the grip to axially move away from the end portion.

22. The end adapter of claim 15, wherein the end portion includes a slot that is adapted to couple with a pin or a shelf disposed in the mount.

* * * * *